United States Patent
Erb et al.

(10) Patent No.: US 7,024,184 B2
(45) Date of Patent: Apr. 4, 2006

(54) CALL REDIRECTION ZONES FOR WIRELESS COMMUNICATIONS

(75) Inventors: Paul Andrew Erb, Ottawa (CA); Maciej Syrowatka, Ottawa (CA)

(73) Assignee: Mitel Knowledge Corporation, Ottawa (CA)

( * ) Notice: Subject to any disclaimer, the term of this patent is extended or adjusted under 35 U.S.C. 154(b) by 223 days.

(21) Appl. No.: 10/696,734

(22) Filed: Oct. 28, 2003

(65) Prior Publication Data

US 2004/0142703 A1  Jul. 22, 2004

(30) Foreign Application Priority Data

Oct. 31, 2002   (GB) .................................... 0225428

(51) Int. Cl.
*H04M 7/20* (2006.01)

(52) U.S. Cl. ..................... 455/417; 455/415; 455/445; 455/456.1

(58) Field of Classification Search ............. 455/414.2, 455/415, 417, 440, 445, 456.1, 456.3, 456.4; 342/450, 463
See application file for complete search history.

(56) References Cited

U.S. PATENT DOCUMENTS

| | | | | |
|---|---|---|---|---|
| 5,119,104 A | * | 6/1992 | Heller | 342/450 |
| 5,473,671 A | * | 12/1995 | Partridge, III | 455/445 |
| 5,548,637 A | * | 8/1996 | Heller et al. | 379/201.07 |
| 5,594,947 A | | 1/1997 | Grube et al. | |
| 5,930,700 A | * | 7/1999 | Pepper et al. | 455/435.3 |
| 5,970,388 A | * | 10/1999 | Will | 340/7.29 |
| 6,085,096 A | | 7/2000 | Nakamura | |
| 6,201,973 B1 | | 3/2001 | Kowaguchi | |
| 6,389,289 B1 | * | 5/2002 | Voce et al. | 455/456.5 |
| 6,608,559 B1 | * | 8/2003 | Lemelson et al. | 340/539.13 |
| 6,665,534 B1 | * | 12/2003 | Conklin et al. | 455/417 |
| 6,738,615 B1 | * | 5/2004 | Chow et al. | 455/415 |
| 6,894,612 B1 | * | 5/2005 | Xydis | 340/539.11 |
| 2002/0013656 A1 | * | 1/2002 | Namba | 701/200 |
| 2002/0122003 A1 | * | 9/2002 | Patwari et al. | 342/450 |
| 2003/0036842 A1 | * | 2/2003 | Hancock | 701/200 |

FOREIGN PATENT DOCUMENTS

| | | |
|---|---|---|
| CA | 2172564 | 10/1996 |
| GB | 2343088 A | 4/2000 |
| GB | 2344971 A | 6/2000 |
| GB | 2348573 A | 10/2000 |
| WO | WO 97/20423 | 6/1997 |
| WO | WO 01/20945 A1 | 3/2001 |

* cited by examiner

*Primary Examiner*—William Trost
*Assistant Examiner*—James D. Ewart
(74) *Attorney, Agent, or Firm*—Beyer Weaver & Thomas, LLP

(57) ABSTRACT

A system and method of controlling the delivery of an incoming call directed to a wireless communication device is provided. When an incoming call directed to the wireless communication device is received, the location of the wireless communication device, to which the incoming call is destined, is determined. If the wireless communication device is not within a designated zone, the incoming call is directed to the wireless communication device. If the wireless communication device is in a designated zone, the incoming call is handled based on specified criteria.

15 Claims, 5 Drawing Sheets

FIRST FLOOR

SECOND FLOOR

FOR EACH FLOOR

A MATRIX OF NORMALIZED SIGNAL STRENGTH IS MANAGED

FOR EACH GRID LOCATION

FOR EACH BASE STATION

| GRID LOCATION \ BASE STATION | $14_1$ | $14_2$ | $14_3$ | $14_4$ | $14_5$ | $14_6$ | $14_7$ | $14_8$ |
|---|---|---|---|---|---|---|---|---|
| A1 | 0 | .1 | .15 | .5 | .2 | .1 | 0 | 0 |
| A2 | 0 | 0 | .2 | .4 | .3 | .15 | 0 | 0 |
| A3 | 0 | 0 | 0 | .2 | .6 | .3 | .1 | 0 |
| · | | | | | | | | |
| · | | | | Ect. | | | | |
| · | | | | | | | | |
| A8 | | | | <BLANK> | | | | |
| B1 | | | | | | | | |
| · | | | | | | | | |
| · | | | | | | | | |
| · | | | | | | | | |
| Ect. | | | | | | | | |

FIG. 3

| REDIREC-TION | PRIMARY SECRETARY | SECONDARY SECRETARY | | IMPORTANCE THRESHOLD | CALLER DIST. | DESIGNATED EXTENSION | COMMENT |
|---|---|---|---|---|---|---|---|
| 1 | 6400 | 6700 | | 1 | A TO E | 4032 | MEETING ROOM |
| 2 | BLANK | BLANK | | 2 | F TO P | BLANK | WASH-ROOM |
| 3 | 6700 | BLANK | | 3 | Q TO W | BLANK | OFFICE |
| ect. | | | | ect. | | | |

FIG. 4

FOR EACH FLOOR

FOR EACH GRID LOCATION

ZONE # OR ∅ i.e. [1]
| | | |
|---|---|---|
| A1 1 | B1 1 | C1 ∅ |
| A2 1 | B2 1 | C2 ∅ |
| A3 ∅ | B3 ∅ | C3 ∅ |
| A4 ∅ | B4 ∅ | C4 ∅ |
| A5 ∅ | B5 ∅ | C5 ∅ |
| A6 ∅ | B6 ∅ | C6 ∅ |
| A7 ∅ | B7 ∅ | C7 ∅ |
| A8 ∅ | B8 ∅ | C8 ∅ | ect.

FIG. 5

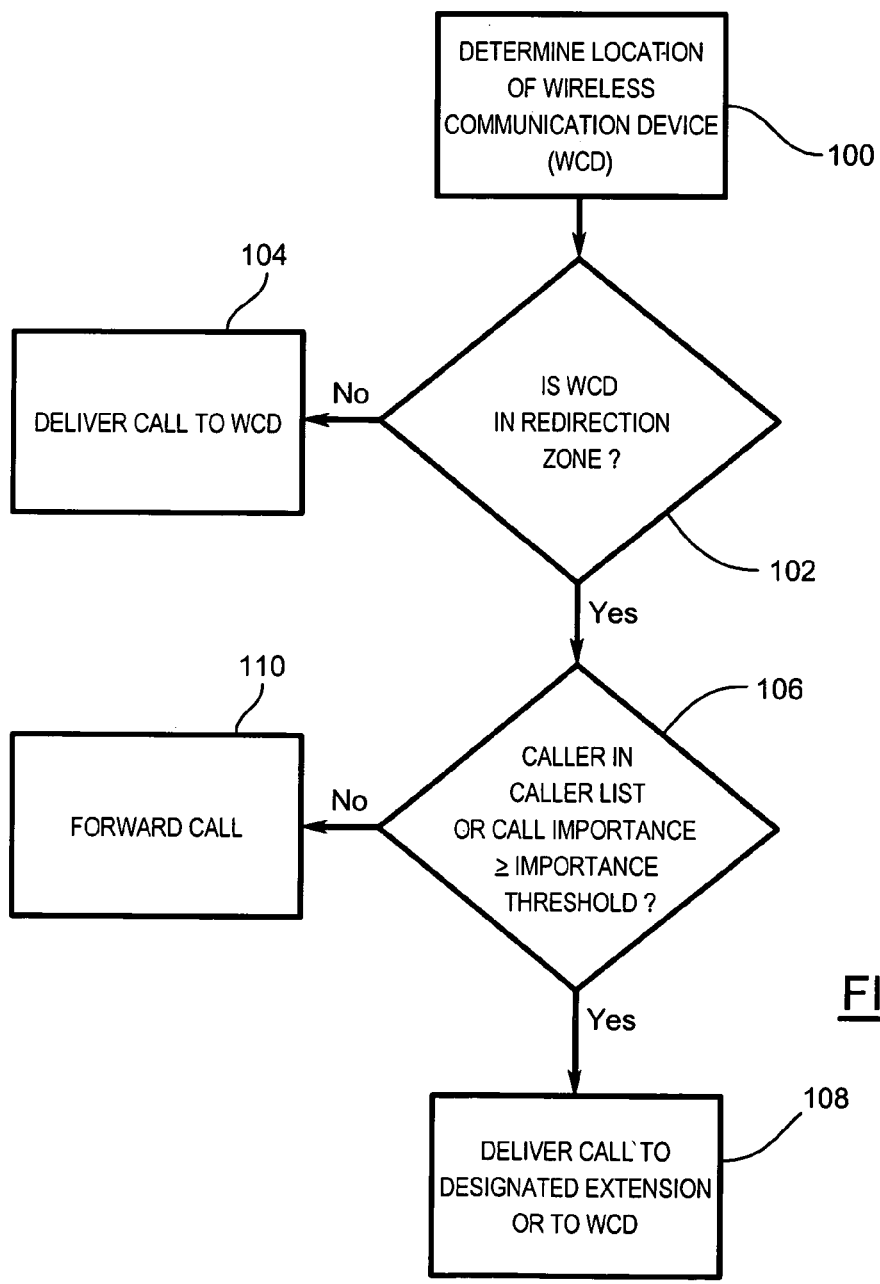

CALL REDIRECTION ZONES FOR WIRELESS COMMUNICATIONS

FIELD OF THE INVENTION

The present invention relates generally to wireless telephony and in particular to a system and method for directing incoming telephone calls destined to wireless communication devices based on redirection criteria.

BACKGROUND OF THE INVENTION

Wireless communication devices such as cellular or mobile telephones and personal digital assistants (PDAs), have become increasingly more popular. In view of this, in any gathering it is likely that a significant number of individuals in attendance is carrying such a wireless communication device. Although wireless communication devices improve reachability, they are often the cause of undesirable interruptions. During important meetings, ringing of cellular telephones can be especially disrupting.

To alleviate this problem, during important meetings or other situations, attendees carrying wireless communication devices are typically instructed to turn their wireless communication devices off for the duration of the meetings. Although this help to avoid disruptions due to ringing of the wireless communication devices, problems arise. If the wireless communication devices are turned off, important incoming calls or messages that would typically take priority over the meetings may be missed. As a result despite the fact that attendees are instructed to turn their wireless communication devices off, because there is potential for missed calls or messages, attendees often disregard these instructions. Also, because it is up to the attendees to turn their wireless communication devices off, meeting chairpersons have no mechanism to enforce compliance with such requests.

It is therefore an object of the present invention to provide a novel system and method for directing incoming telephone calls destined to wireless communication devices based on redirection criteria.

SUMMARY OF THE INVENTION

According to one aspect of the present invention there is provided a method of controlling the delivery of an incoming call directed to a wireless communication device comprising the steps of:

determining generally the location of the wireless communication device to which said incoming call is directed;

if said wireless communication device is not within a designated zone, directing the incoming call to said wireless communication device; and if said wireless communication device is in a designated zone handling said incoming call based on specified criteria.

Preferably, during the handling if the incoming call meets the specified criteria, the incoming call is directed to one of a designated extension within the designated zone and the wireless communication device. In the preferred embodiment, if the incoming call is from a designated caller, the incoming call is directed to the designated extension if it exists; otherwise the incoming call is directed to the wireless communication device. Alternatively, if the incoming call has an importance value exceeding an importance threshold, the incoming call is directed to the designated extension if it exists; otherwise the incoming call is directed to the wireless communication device. If the incoming call does not meet the specified criteria, the incoming call is directed to an extension outside of the designated zone.

Preferably, delivery of incoming calls is controlled within a location having a plurality of designated zones. Each of the designated zones is defined by a specified area within the location. The designated zones may include individual rooms within the location. The location is divided by a grid into grid locations and the designated zones are mapped to the grid locations. The mapping is used during the determining to determine if the wireless communication device is located within a designated zone. In a preferred embodiment, the location of the wireless communication device is determined using triangulation based on wireless signal strengths to base stations at the location.

According to another aspect of the present invention there is provided a system for controlling the delivery of an incoming call directed to a wireless communication device comprising:

means for determining generally the location of the wireless communication device to which said incoming call is directed and for determining if said wireless communication device is within a designated zone; and means for directing the incoming call to said wireless communication device if said wireless communication device is not within a designated zone and for handling said incoming call based on specified criteria if said wireless communication device is in a designated zone.

According to yet another aspect of the present invention there is provided a telephone system to control the delivery of an incoming call directed to a wireless communication device within a location, said location being subdivided into a plurality of grid locations and including redirection zones therein, each redirection zone encompassing a subset of said grid locations, said system comprising:

a position determinor for determining the location of a wireless communication device within said location to which an incoming call is destined; and a call handler for determining if said wireless communication device is in a redirection zone and for handling delivery of said incoming call in accordance with the results of said determining.

The present invention provides advantages in that the delivery of incoming calls directed to wireless communication devices can be controlled so that important meetings or other gatherings are not interrupted by incoming calls that do not take priority over the meetings or gatherings.

BRIEF DESCRIPTION OF THE DRAWINGS

An embodiment of the present invention will now be described more fully with reference to the accompanying drawings in which:

FIG. 3 is a table illustrating the grid locations dividing one of the floors of FIG. 1 and associated wireless signal strengths of nearby wireless base stations;

FIG. 4 is a table illustrating redirection zones within the building;

FIG. 5 is a table illustrating the mapping between the grid locations of FIG. 2 and one of the redirection zones of FIG. 3;

FIG. 6 is a table showing incoming call importance thresholds; and

FIG. 7 is a flow chart showing the steps performed during delivery of an incoming call directed to a wireless communication device.

DETAILED DESCRIPTION OF THE INVENTION

The present invention relates to a system and method of controlling the delivery of an incoming call directed to a wireless communication device. When an incoming call directed to a wireless communication device is received, the location of the wireless communication device to which the incoming call is destined, is determined. If the wireless communication device is not within a designated zone the incoming call is directed to the wireless communication device. If the wireless communication device is in a designated zone, the incoming call is handled based on specified criteria. In this manner, important meetings are not interrupted by incoming calls to wireless communication devices unless the incoming calls take priority over the meetings. A preferred embodiment of the present invention will now be described with particular reference to the delivery of incoming telephone calls directed to a wireless communication device such as a cellular or mobile phone. It should however be appreciated that the present system and method applies equally to the delivery of incoming messages directed to other wireless communication devices such as PDAs. Within the context of the present application, "incoming call" refers to the delivery of a telephone call, an instant message or other form of communication directed to a wireless communication device.

Figure 1:
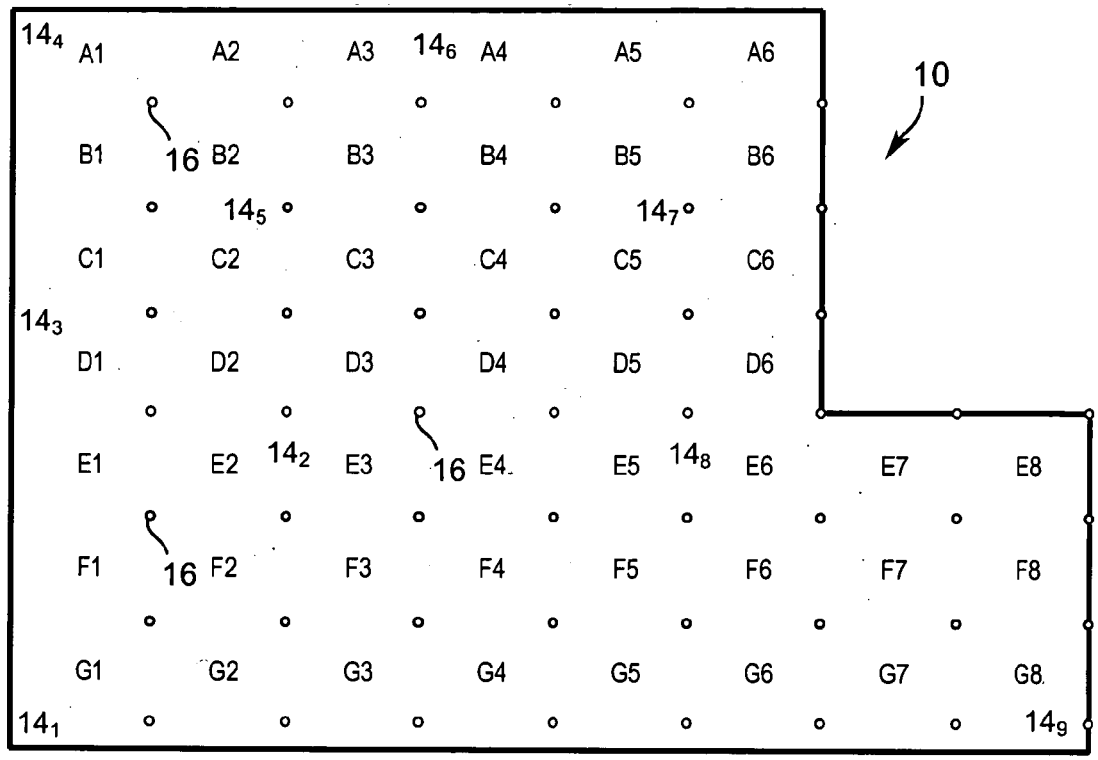
FIG. 1 shows top plan views of two floors in a building divided into grid locations by spatial grids.
Figure 1:
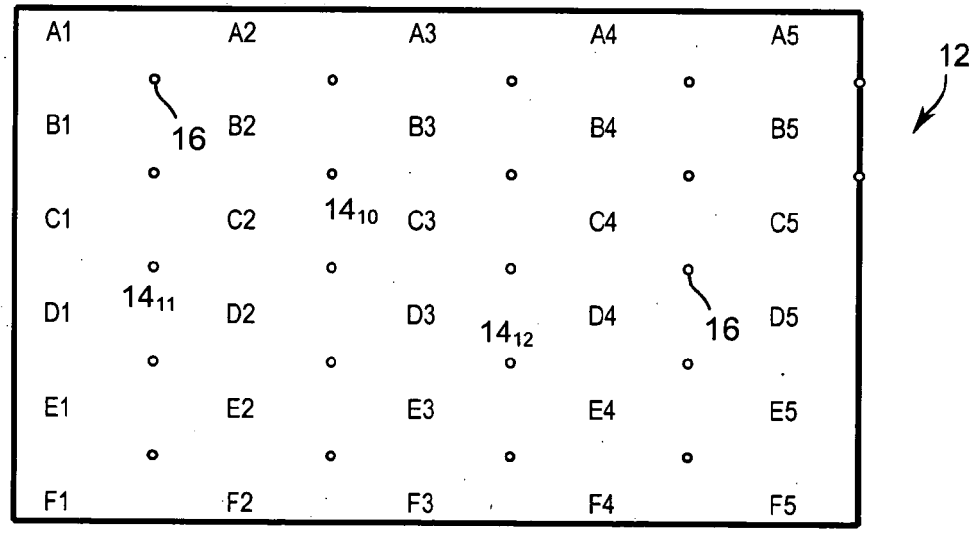

Turning now to FIG. 1, two floors 10 and 12 in a structure such as an office building are shown. Base stations $14_1$ $14_N$ are provided on each of the floors to provide wireless communications coverage within the building. Each floor is subdivided into uniform grid locations by a spatial grid. In this particular example, floor 10 is subdivided into grid locations $A_1$ to $G_8$ and floor 12 is subdivided into grid locations $A_1$ to $G_5$. The size of the grid locations can be selected to suit the environment. In this particular embodiment, uniformly distributed pillars 16 on each floor are used to determine the size of the grid locations.

Figure 2:
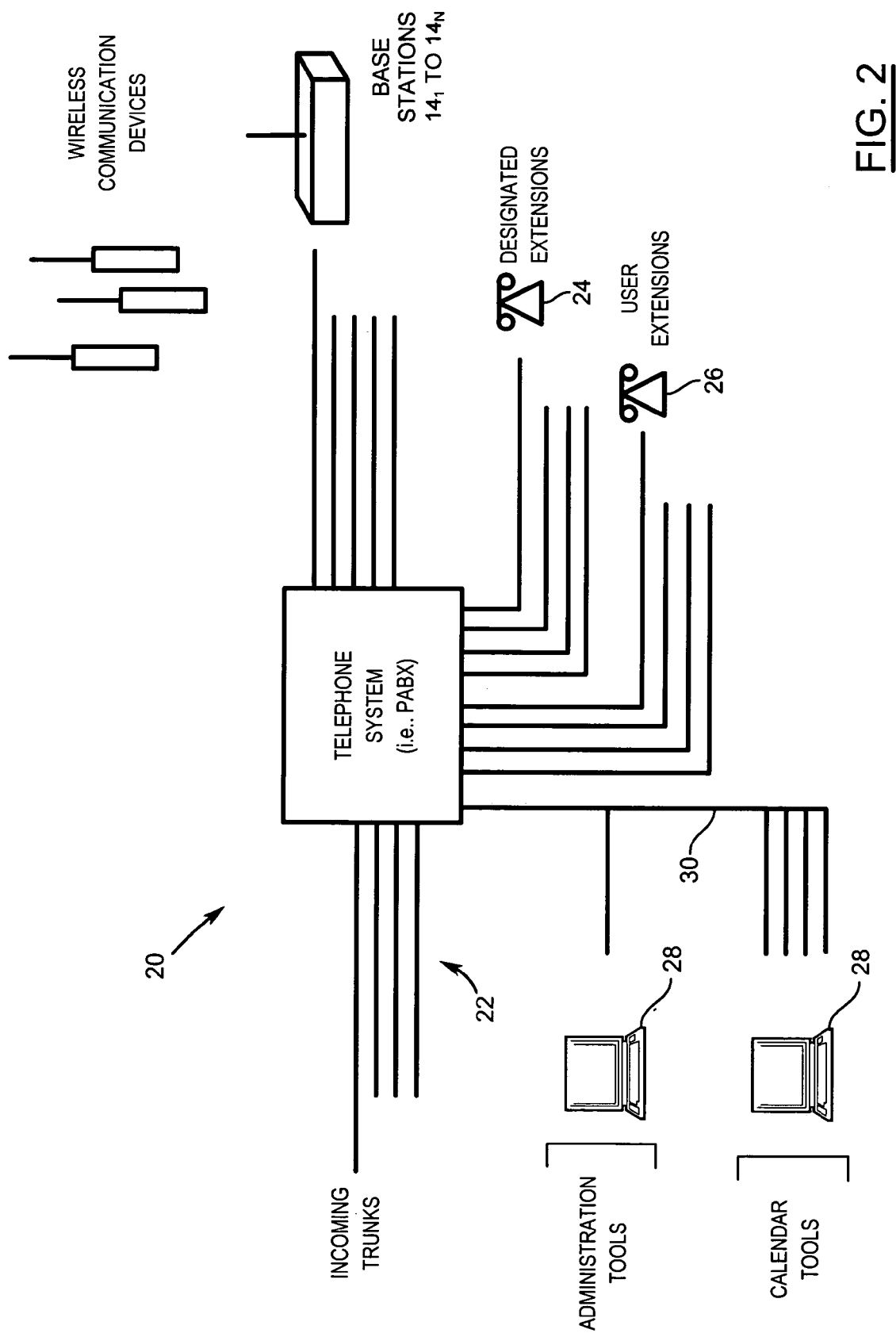
FIG. 2 is a schematic diagram of a telephone system servicing the building shown in FIG. 1.

A telephone system 20 within the building services the floors 10 and 12 (see FIG. 2). As can be seen, the telephone system 20 is connected to incoming trunks 22 as well as to the base stations $14_1$ to $14_N$, telephones 24 associated with designated extensions and telephones 26 associated with user extensions. The telephone system 20 is also connected to computers 28 running administration and/or calendar tools over a local area network 30.

The telephone system 20 is programmed with the grid locations on each floor and with the associated wireless signal strengths of the base stations $14_1$ to $14_N$ on the floors. FIG. 3 shows some of the grid locations on floor 10 and the wireless signal strengths of the nearby base stations $14_1$ to $14_8$. For example, as can be seen for grid location $A_3$, the wireless signal strength of base stations $14_1$, $14_2$, $14_3$ and $14_8$ is zero (0), the wireless signal strength of base station $14_4$ is 0.2, the wireless signal strength of base station $14_5$ is 0.6, the wireless signal strength of base station $14_6$ is 0.3 and the wireless signal strength of base station $14_7$ is 0.1.

The wireless signal strengths of the various base stations at each of the grid locations can be determined in a number of ways. For example, the wireless signal strengths may be determined manually or automatically using a wireless communication device while walking across the floors by detecting the presence of the wireless communication device at the various grid locations. Alternatively the wireless signal strengths can be determined by mathematical calculation.

The telephone system 20 is also programmed with redirection zones within one or both of the floors. The redirection zones correspond with designated areas or zones on the floors such as for example, meeting and/or conference rooms where it is desired to control delivery of incoming calls to wireless communication devices carried by individuals in these designated areas. Each redirection zone indicates the extension of one or more designated caller, in this example, the extensions of a primary assistant and a secondary assistant, an importance threshold, a caller list, a designated extension and commentary indicating the area on the floor encompassed by the redirection zone. The telephone system 20 maps the grid locations dividing the floors to the redirection zones and uses the mapping to handle the delivery of incoming calls as will be described. FIG. 5 illustrates the mapping of the grid location on floor 10 with one of the redirection zones.

FIG. 4 shows an example of three redirection zones. The designated extension is typically the extension of a telephone located within the redirection zone. The importance threshold is based on caller information such as for example, caller identification (ID), the dialed telephone number, the external trunk from which the incoming call was received and the name of the recipient. The caller list specifies particular designated callers. FIG. 6 shows an example of the criteria used to establish the importance threshold.

The administration tools enable the grid locations, redirection zones and grid location-to-redirection zone mappings stored by the telephone system 20 to be reconfigured. The administration tools also enable the chairperson of a meeting either to create a redirection zone corresponding to the location where the meeting is to be held, or to modify the redirection zone associated with the meeting location.

The operation of the telephone system 20 in response to an incoming call directed to a wireless communication device will now be described with particular reference to FIGS. 5 and 7. When an incoming call directed to a wireless communication device is received by the telephone system 20, the approximate grid location of the wireless communication device to which the incoming call is destined, is determined using triangulation by the telephone system 20 based on the wireless signal strengths to nearby base stations $14_1$ to $14_N$ (step 100). With the grid location of the wireless communication device known, the grid location-to-redirection zone mapping is used to determine if the wireless communication device is located in a redirection zone (step 102). If the wireless communication device is not located in a redirection zone, the incoming call is delivered to the wireless communication device (step 104).

If the wireless communication device is located in a redirection zone, the caller is examined to determine if the caller is a designated caller specified in the redirection zone or if the call importance exceeds the importance threshold assigned to the redirection zone (step 106). If the incoming call meets one or more of the above criteria, the incoming call is delivered to the designated extension associated with the redirection zone or is delivered to the wireless communication device if no designated extension is associated with the redirection zone (step 108). If none of the above criteria is met, the incoming wireless call is re-directed to a preconfigured destination (step 110).

If desired, the telephone system 20 can be programmed to present the caller with a message indicating to the caller that they are about to be redirected and provide the caller with the option of overriding the call redirection. For example, the caller may be presented with the message "... is in a very important meeting. Your call is being redirected. To override and call anyway say "override"". Alternatively, the telephone system 20 may be programmed to allow the caller to augment call notifications using other communication forms such as for example by instant messaging.

Although the location of the recipient's wireless communication device is described as being determined using triangulation based on wireless signal strengths, those of skill in the art will appreciate that other systems of determining the location of the wireless communication device can be used such as for example, global position satellite (GPS), Blue Tooth discovery or other suitable systems.

The criteria used to determine the importance threshold may utilize alternative or additional factors relating to the incoming call. In addition, the redirection zones may include a private field to inhibit personal calls from being directed to the designated extension. In this case, private calls are directed to the wireless communications device even if the redirection zone includes a designated extension.

Although the telephone system 20 has been described as servicing an office building including two floors, those of skill in the art will appreciate that this is for illustrative purposes only. The telephone system may be used in virtually any environment where it is desired to control the delivery of incoming calls directed to wireless communication devices to avoid interruptions such as for example, in theatres, restaurants, performing art halls etc. Furthermore, although particular reference is made to cellular telephones, the telephone system is equally suited to control the delivery of calls, messages or other communications to PDAs or other portable wireless communication devices.

If desired, the importance threshold can be modified based on recipient preferences extracted from an application such as a calendar tool. The redirection of calls may also be controlled based on the time of day, the recipient's class of service or alternative criteria. Incoming call that are directed to a designated extension in a redirection zone or directly to the wireless communication device within the redirection zone may be filtered by the telephone system 20 prior to actual delivery of the incoming call.

Although a preferred embodiment of the present invention has been described, those of skill in the art will appreciate that variations and modifications may be made without departing from the spirit and scope thereof as defined by the appended claims.

What is claimed is:

1. A method of controlling the delivery of an incoming call directed to a wireless communication device comprising the steps of:
   determining generally the location of the wireless communication device to which said incoming call is directed;
   if said wireless communication device is not within a designated zone, directing the incoming call to said wireless communication device; and
   if said wireless communication device is in a designated zone handling said incoming call based on specified criteria by redirecting said incoming call to a designated extension within said designated zone if said incoming call meets said specified criteria, and redirecting said incoming call to an extension outside of said designated zone if said incoming call does not meet said specified criteria.

2. The method of claim 1 wherein when said specified criteria includes a designated caller list.

3. The method of claim 2 wherein if the incoming call meets said specified criteria but is deemed private, said incoming call is directed to said wireless communication device irrespective of location of said wireless communication device.

4. The method of claim 2 wherein said specified criteria further includes an importance threshold, incoming calls received from callers in said designated caller list and/or incoming calls having an importance value equal to or exceeding said importance threshold, meeting said specified criteria.

5. The method of claim 1 wherein delivery of incoming calls is controlled within a location having a plurality of designated zones, each of said designated zones being defined by a specified area within said location.

6. The method of claim 5 wherein said designated zones include rooms within said location.

7. The method of claim 6 wherein said location is subdivided by a grid into grid locations and wherein said designated zones are mapped to said grid locations, said mapping being used during said determining to determine if said wireless communication device is located within a designated zone.

8. The method of claim 7 wherein during said determining, the location of said wireless communication device is determined using triangulation based on wireless signal strength to base stations at said location.

9. A system for controlling the delivery of an incoming call directed to a wireless communication device comprising:
   means for determining generally the location of the wireless communication device to which said incoming call is directed and for determining if said wireless communication device is within a designated zone; and
   means for directing the incoming call to said wireless communication device if said wireless communication device is not within a designated zone and for handling said incoming call based on specified criteria if said wireless communication device is in a designated zone by redirecting said incoming call to a designated extension within said designated zone if said incoming call meets said specified criteria, and redirecting said incoming call to an extension outside of said designated zone if said incoming call does not meet said specified criteria.

10. A system according to claim 9 wherein if the incoming call meets said specified criteria but is deemed private, said directing means directs said incoming call to said wireless communication device irrespective of location of said wireless communication device.

11. A system according to claim 9 wherein said specified criteria includes a designated caller list and an importance threshold, incoming calls received from callers in said designated caller list and/or incoming calls having an importance value equal to or exceeding said importance threshold, meeting said specified criteria.

12. A system according to claim 9 wherein delivery of incoming calls is controlled within a location having a plurality of designated zones, each of said designated zones being defined by a specified area within said location.

13. A system according to claim 12 wherein said location is subdivided by a grid into grid locations and wherein said designated zones are mapped to said grid locations, said directing means using said mapping to determine if said wireless communication device is located within a designated zone.

14. A telephone system to control the delivery of an incoming call directed to a wireless communication device within a location, said location being subdivided into a plurality of grid locations and including redirection zones therein, each redirection zone encompassing a subset of said grid locations, said system comprising:

a position determinor for determining the location of a wireless communication device within said location to which an incoming call is destined; and a call handler for determining if said wireless communication device is in a redirection zone and for handling delivery of said incoming call in accordance with the results of said determining by redirecting said incoming call to a designated extension within said designated zone if said incoming call meets a specified criteria, and redirecting said incoming call to an extension outside of said designated zone if said incoming call does not meet said specified criteria.

15. A telephone system according to claim 14 wherein said position determinor uses triangulation based on wireless signal strengths to base stations at said location to determine the location of said wireless communication device therein.

* * * * *